United States Patent
Ko et al.

(10) Patent No.: US 8,174,583 B2
(45) Date of Patent: May 8, 2012

(54) OPTICAL IMAGE STABILIZER FOR CAMERA MODULE ASSEMBLY

(75) Inventors: Kil-Soo Ko, Suwon-si (KR); Doo-Sik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 159 days.

(21) Appl. No.: 12/793,137

(22) Filed: Jun. 3, 2010

(65) Prior Publication Data

US 2010/0309322 A1  Dec. 9, 2010

(30) Foreign Application Priority Data

Jun. 3, 2009  (KR) .................. 10-2009-0048843

(51) Int. Cl.
*H04N 5/228* (2006.01)
*G03B 17/00* (2006.01)

(52) U.S. Cl. ............. 348/208.7; 348/208.11; 348/208.4; 396/55

(58) Field of Classification Search ............... 348/208.7, 348/208.11, 208.4, 208.2; 396/55, 52, 54
See application file for complete search history.

(56) References Cited

U.S. PATENT DOCUMENTS

| | | | | |
|---|---|---|---|---|
| 7,379,093 | B2 * | 5/2008 | Seo ............................. | 348/208.4 |
| 7,912,362 | B2 * | 3/2011 | Lim et al. ........................ | 396/55 |
| 2006/0132613 | A1 * | 6/2006 | Shin et al. .................. | 348/208.7 |
| 2006/0269262 | A1 | 11/2006 | Shin et al. | |
| 2007/0257989 | A1 | 11/2007 | Shirono | |
| 2008/0013939 | A1 * | 1/2008 | Ogawa ........................... | 396/55 |
| 2009/0002502 | A1 | 1/2009 | Shirono | |
| 2009/0097834 | A1 | 4/2009 | Jang et al. | |
| 2010/0123788 | A1 * | 5/2010 | Shin ........................ | 348/208.11 |

FOREIGN PATENT DOCUMENTS

| | | |
|---|---|---|
| EP | 1 727 358 | 11/2006 |
| EP | 1 729 509 | 12/2006 |
| KR | 10-2005004454 | 11/2006 |

\* cited by examiner

*Primary Examiner* — Tuan Ho
*Assistant Examiner* — Shahbaz Nazrul
(74) *Attorney, Agent, or Firm* — The Farrell Law Firm, P.C.

(57) ABSTRACT

Provided is an optical image stabilizer for a camera module assembly including at least one or more guide portions for guiding linear movement while preventing friction in first and second drive portions. The optical image stabilizer includes a first drive portion including a tip provided between a housing and a first drive plate to drive the first drive plate in a first direction, a second drive portion including a tip provided between the first drive plate and a second drive plate to drive the second drive plate in a second direction, and first and second guide portions formed in the first and second drive plates in positions corresponding to the tips of the first and second drive portions such that the first and second guide portions guide linear movement of the tips and prevent friction when the first and second drive portions are driven in the first and second directions.

9 Claims, 9 Drawing Sheets

OPTICAL IMAGE STABILIZER FOR CAMERA MODULE ASSEMBLY

PRIORITY

This application claims priority under 35 U.S.C. §119(a) to a Korean Patent Application filed in the Korean Intellectual Property Office on Jun. 3, 2009 and assigned Serial No. 10-2009-0048843, the contents of which are incorporated herein by reference.

BACKGROUND OF THE INVENTION

1. Field of the Invention

The present invention relates to an optical image stabilizer for a camera module assembly, in which one or more guide portions for guiding linear movement while preventing friction are provided in first and second drive portions.

2. Description of the Related Art

With the recent proliferation of digital still and video cameras, there is an increasing demand for photographing high-quality still and moving pictures. In particular, a Complementary Metal Oxide Semiconductor (CMOS) sensor has replaced a Charge Coupled Device (CCD) sensor as a photographing device for a digital camera, because although the CCD sensor is superior to the CMOS sensor in terms of image quality, the CMOS sensor consumes less power and has a simpler structure. Accordingly, the market share of the CMOS sensor is increasing and recently, the image quality of the CMOS sensor has also improved. Along with the development of image sensors such as the CCD and CMOS sensors, the use of digital cameras has become common and a camera module is now installed in a portable terminal such as a cellular phone.

When the CMOS sensor is used, the resolution of a picture significantly degrades due to a hand-shake of the picture taker (user). Therefore, the use of an optical image stabilizer is increasing to prevent the resolution of a picture from degrading due to external vibrations or a hand-shake of a user.

A conventional optical image stabilizer for a camera module assembly may be one that drives an image sensor or performs stabilization by driving a lens. The optical image stabilizer may be controlled by a stepping motor drive system or a Voice Coil Motor (VCM) actuator system.

The VCM actuator system can be found in Korean Patent Publication No. 2006-122237 which discloses an optical image stabilizer.

The disclosed optical image stabilizer is structured such that an X-axis drive permanent magnet and coil and a Y-axis drive permanent magnet and coil are disposed at the edge of an optical lens, a drive frame and a ball bearing for supporting driving of the permanent magnets and coils are provided, and a current is applied to the X-axis drive permanent magnet and coil and the Y-axis drive permanent magnet and coil based on the amount of blurring of an object to drive the optical lens by a hand-shake displacement amount with an electromagnetic force.

Although the conventional optical image stabilizer for the camera module assembly includes a ball bearing for supporting linear movement, it is limited in regards to precisely controlling linear movement along an X-axis and a Y axis only with the ball bearing. To solve the problem, if a plurality of ball bearings are provided in the optical image stabilizer, the structure (thickness) of the drive portion becomes large and complicated, making it difficult to implement a camera module assembly for a subminiature digital camera and a portable terminal.

Accordingly, there is a need for an additional guiding device for supporting a drive function of an existing ball bearing.

SUMMARY OF THE INVENTION

An aspect of the present invention is to address at least the above problems and/or disadvantages and to provide at least the advantages described below. Accordingly, an aspect of the present invention is to provide an optical image stabilizer for a camera module assembly, in which at least one or more guide portions for guiding linear movement while preventing friction are provided in first and second drive portions, thereby facilitating linear movement of a product, allowing precise control through installation of the guide portions in addition to an existing ball bearing for supporting driving, reducing the size of the product, and thus making it possible to implement a camera module assembly for a complex subminiature digital camera and a portable terminal.

Another aspect of the present invention is to provide an optical image stabilizer for a camera module assembly, in which drive plates include magnetic objects and, along with a plurality of permanent magnets and yokes, are connected to each other by magnetic forces, thereby improving the functions of a product.

According to an aspect of the present invention, there is provided an optical image stabilizer for a camera module assembly, which includes a housing, a first drive plate for driving in a first direction, a second drive plate which includes an image sensor and is provided under the first drive plate for driving in a second direction, and at least one or more ball bearings provided between the housing and the first drive plate and between the first drive plate and the second drive plate, the optical image stabilizer including a first drive portion having a tip provided between the housing and the first drive plate to drive the first drive plate in the first direction, a second drive portion having a tip provided between the first drive plate and the second drive plate to drive the second drive plate in the second direction, and first and second guide portions formed in the first and second drive plates in positions corresponding to the tips of the first and second drive portions such that the first and second guide portions guide linear movement of the tips and prevent friction when the first and second drive portions are driven in the first and second directions.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE INVENTION

Figure 1:
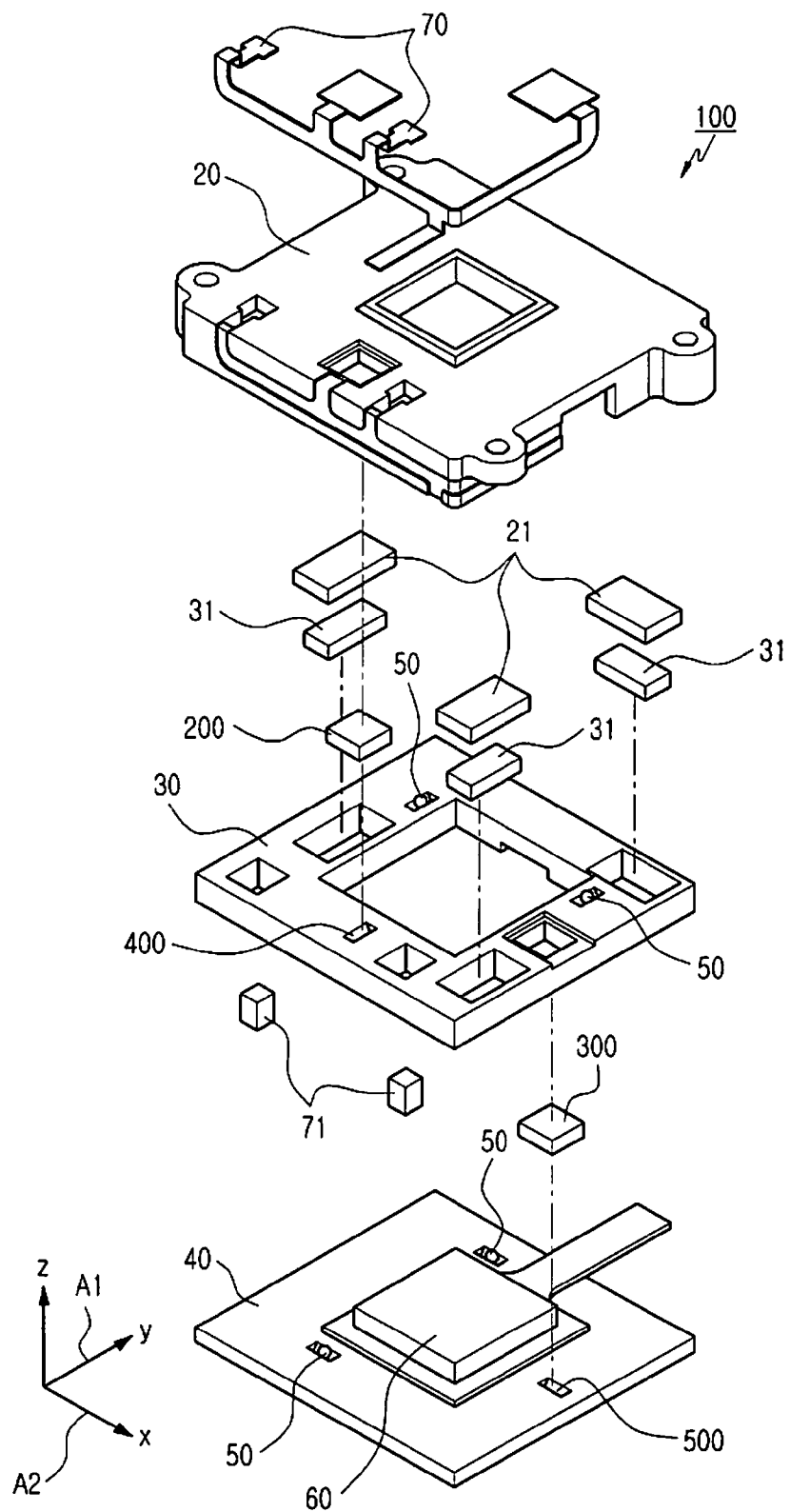
FIG. 1 illustrates an optical image stabilizer for a camera module assembly according to an embodiment of the present invention.
Figure 2:
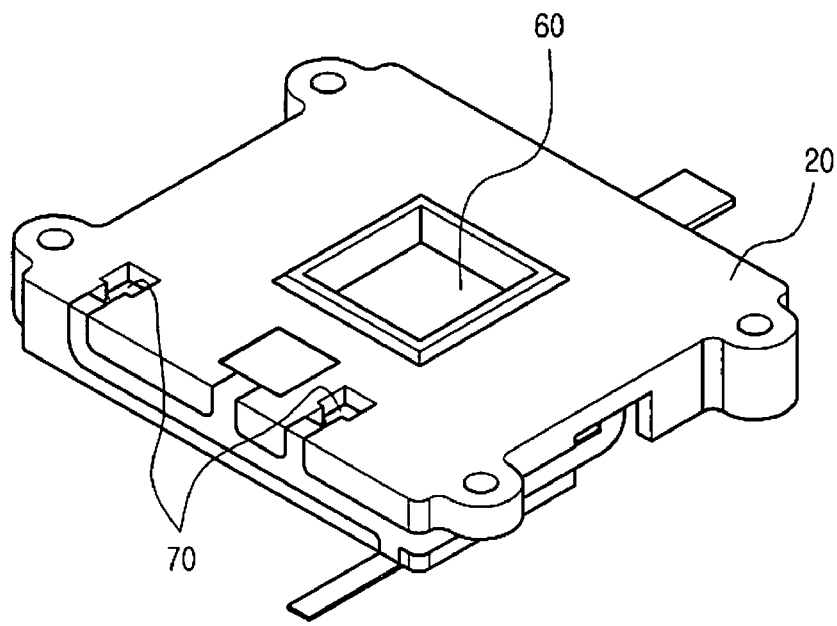
FIG. 2 illustrates an assembled state of an optical image stabilizer for a camera module assembly according to an embodiment of the present invention.

Hereinafter, embodiments of the present invention will be described in detail with reference to the accompanying drawings. The embodiments described herein and structures shown in the drawings are merely illustrative and do not cover every technical spirit of the invention. Therefore, it will be understood that various modifications that can substitute for the embodiments can be made at the time of filing the present application. Descriptions of well-known functions and constructions are omitted herein for the sake of clarity and conciseness.

As shown in FIGS. 1 through 10, an optical image stabilizer 100 for a camera module assembly 1 includes a housing 20, first and second drive plates 30 and 40, one or more ball bearings 50, first and second drive portions 200 and 300, and first and second guide portions 400 and 500. The housing 20 is configured to include the first and second drive plates 30 and 40, the ball bearings 50, the first and second drive portions 200 and 300, and the first and second guide portions 400 and 500 in that order. The first drive plate 30 is included in the housing 20 to drive an image sensor 60 and the second drive plate 40 together in a first direction A1. The second drive plate 40 includes the image sensor 60, and is provided under the first drive plate 30 to drive the image sensor 60 in a second direction A2.

The at least one or more ball bearings 50 are provided between the housing 20 and the first drive plate 30 and between the first drive plate 30 and the second drive plate 40 to enable driving of the first and second drive plates 30 and 40. The first drive portion 200 is provided between the housing 20 and the first drive plate 30 to drive the first drive plate 30 in the first direction A1. The second drive portion 300 is provided between the first drive plate 30 and the second drive plate 40 to drive the second drive plate 40 in the second direction A2.

Figure 5:
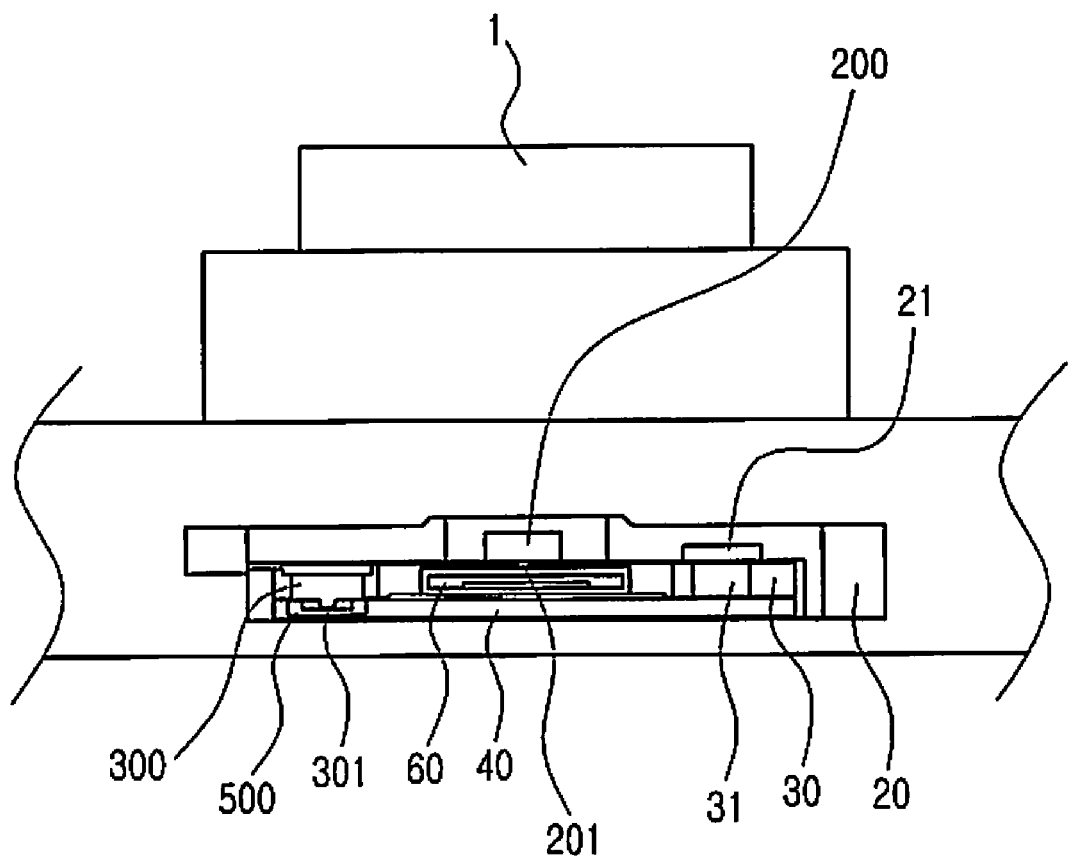
FIG. 5 is a cross-sectional view taken along a line A-A' of FIG. 4.
Figure 6:
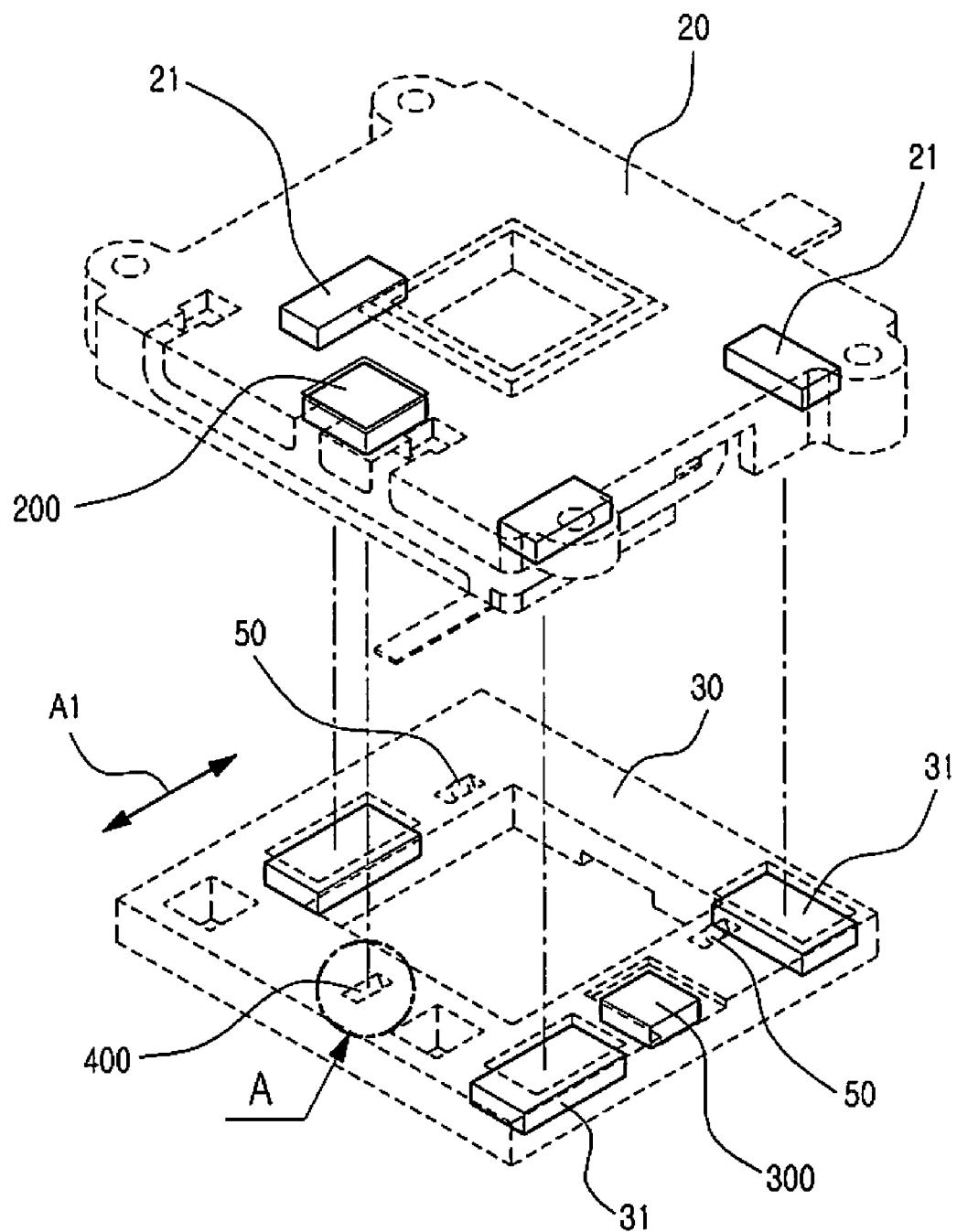
FIG. 6 illustrates a housing and a first drive plate in an optical image stabilizer for a camera module assembly according to an embodiment of the present invention.
Figure 10:
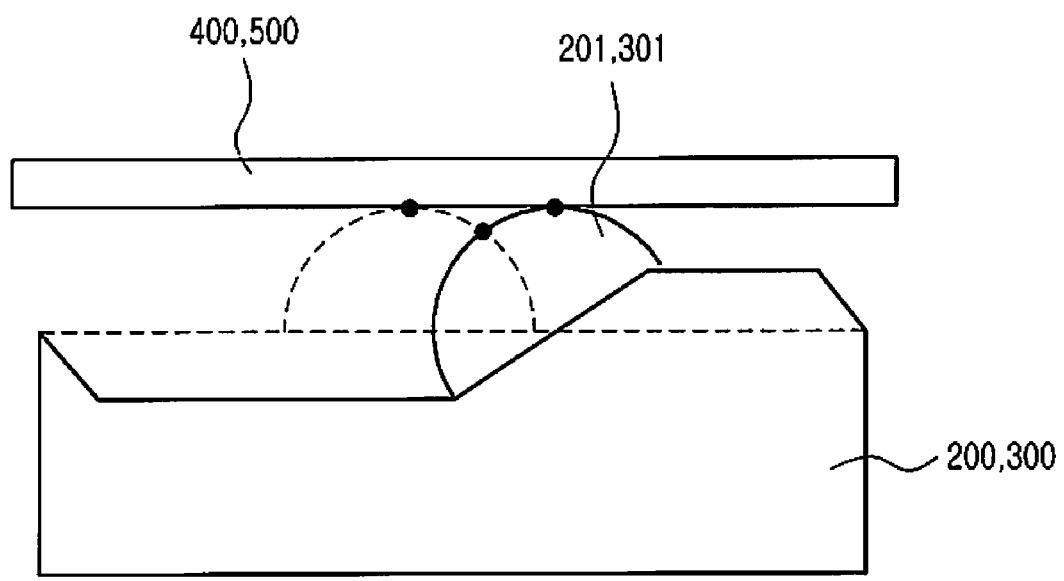
FIG. 10 illustrates the operation states of first and second drive portions in an optical image stabilizer for a camera module assembly according to an embodiment of the present invention.

As illustrated in FIGS. 5 and 10, formed on the first and second drive portions 200 and 300 are tips 201 and 301 that contact the first and second guide portions 400 and 500 and linearly move during driving. The first and second guide portions 400 and 500 are provided in positions corresponding to the tips 201 and 301 of the first and second drive portions 200 and 300. The first and second guide portions 400 and 500 are formed in the first and second drive plates 30 and 40, respectively, to guide linear movement of the tips 201 and 301 and also prevent friction during driving of the first and second drive portions 200 and 300.

As shown in FIGS. 1 and 10, the first and second drive portions 200 and 300 are piezo actuators and may also be drivable actuators other than the piezo actuators.

As shown in FIGS. 6 through 9, the tips 201 and 301 are in hemispheric shapes to prevent friction when contacting the first and second guide portions 400 and 500, and the first and second guide portions 400 and 500 include V-shaped grooves to prevent friction.

As shown in FIGS. 1 through 9, the first direction A1 is a Y-axis direction and the first drive portion 200 is adapted to drive the first drive plate 30 back and forth in the Y-axis direction. The second direction A2 is an X-axis direction and the second drive portion 300 is adapted to drive the second drive plate 40 back and forth in the X-axis direction.

As shown in FIG. 1, the second drive plate 40 is a steel plate that includes a heat sink for cooling the image sensor 60.

As shown in FIGS. 1 through 9, provided in the housing 20 are one or more yokes 21 in positions corresponding to one or more fixing permanent magnets 31 included in the first drive plate 30, so as to urge the housing 20 and the first drive plate 30 to attract and connect to each other by magnetic forces. Provided in the second drive plate 40 are magnetic objects in positions corresponding to the one or more fixing permanent magnets 31 included in the first drive plate 30, so as to urge the first drive plate 30 and the second drive plate 40 to attract and connect to each other by magnetic forces.

As shown in FIG. 1, the yokes 21 are steel magnetic objects so that the yokes 21 and the permanent magnets 31 attract each other.

An operation process of the optical image stabilizer structured as described above according to an embodiment of the present invention will be described in more detail with reference to FIGS. 1 through 10.

The optical image stabilizer 100 for the camera module assembly 1 includes the housing 20, the first drive plate 30 for driving in the first direction A1, the second drive plate 40 which has the image sensor 60 and is provided under the first drive plate 30 to drive the image sensor 60 in the second direction A2, the at least one or more ball bearings 50 provided between the housing 20 and the first drive plate 30 and between the first drive plate 30 and the second drive plate 40, the first and second drive portions 200 and 300, and the first and second guide portions 400 and 500.

As shown in FIG. 10, the first and second drive portions 200 and 300 are piezo actuators.

As shown in FIGS. 1 through 9, the first drive portion 200 is provided between the housing 20 and the first drive plate 30. In this state, the tip 201 formed on the first drive portion 200 and the first guide portion 400 formed in the first drive plate 30 contact each other and are coupled to each other in such a manner as to be driven in the first direction A1 (or the Y-axis direction).

Figure 7:
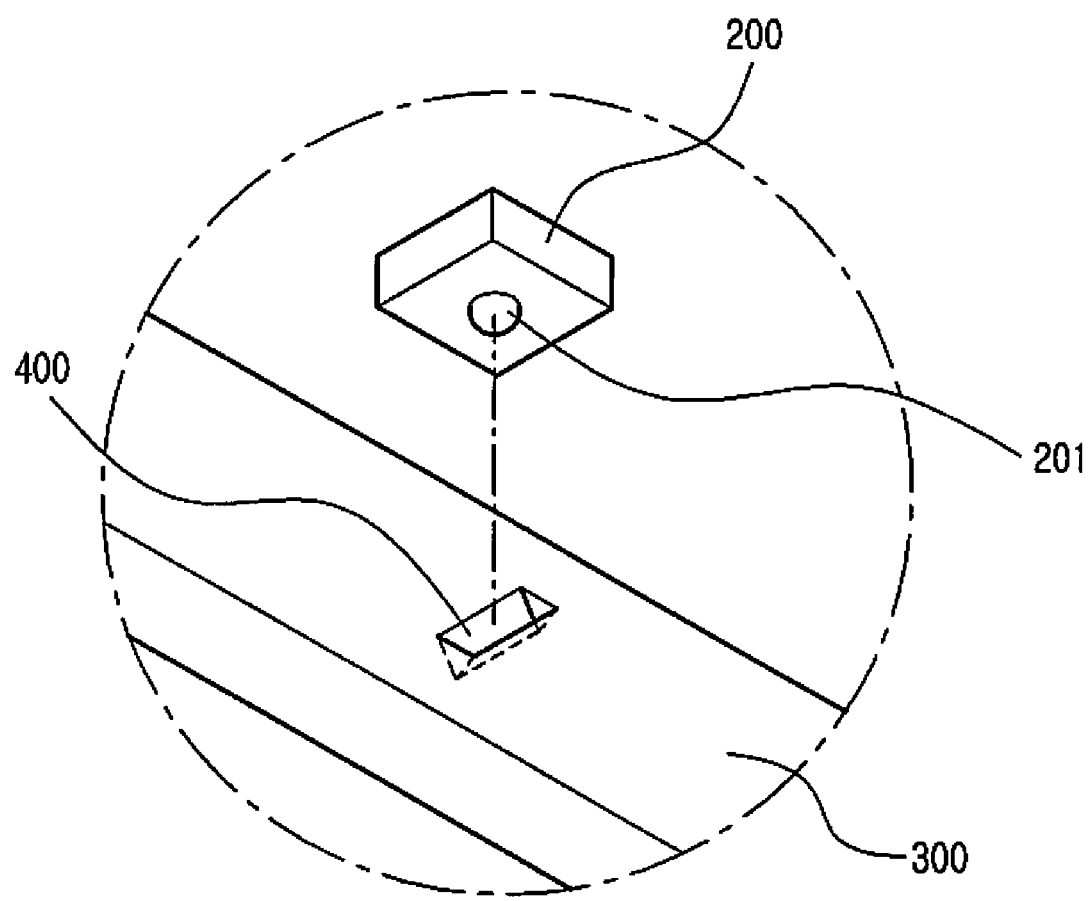
FIG. 7 is an exploded perspective view of a portion A of FIG. 6.
Figure 8:
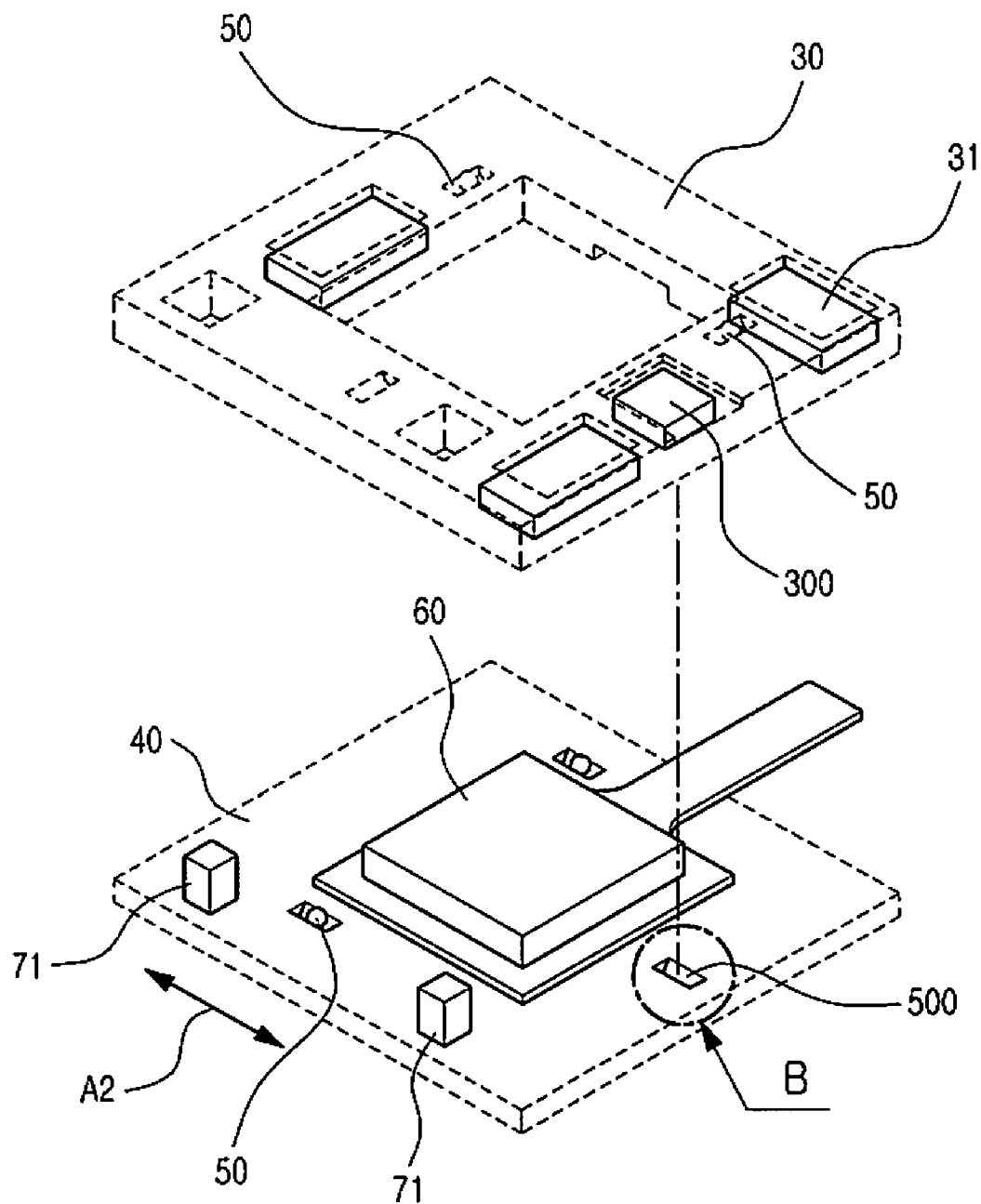
FIG. 8 illustrates first and second drive plates in an optical image stabilizer for a camera module assembly according to an embodiment of the present invention.

As shown in FIG. 7, the tip 201 is formed in a hemispheric shape, and the first guide portion 400 includes a V-shaped groove.

Figure 4:
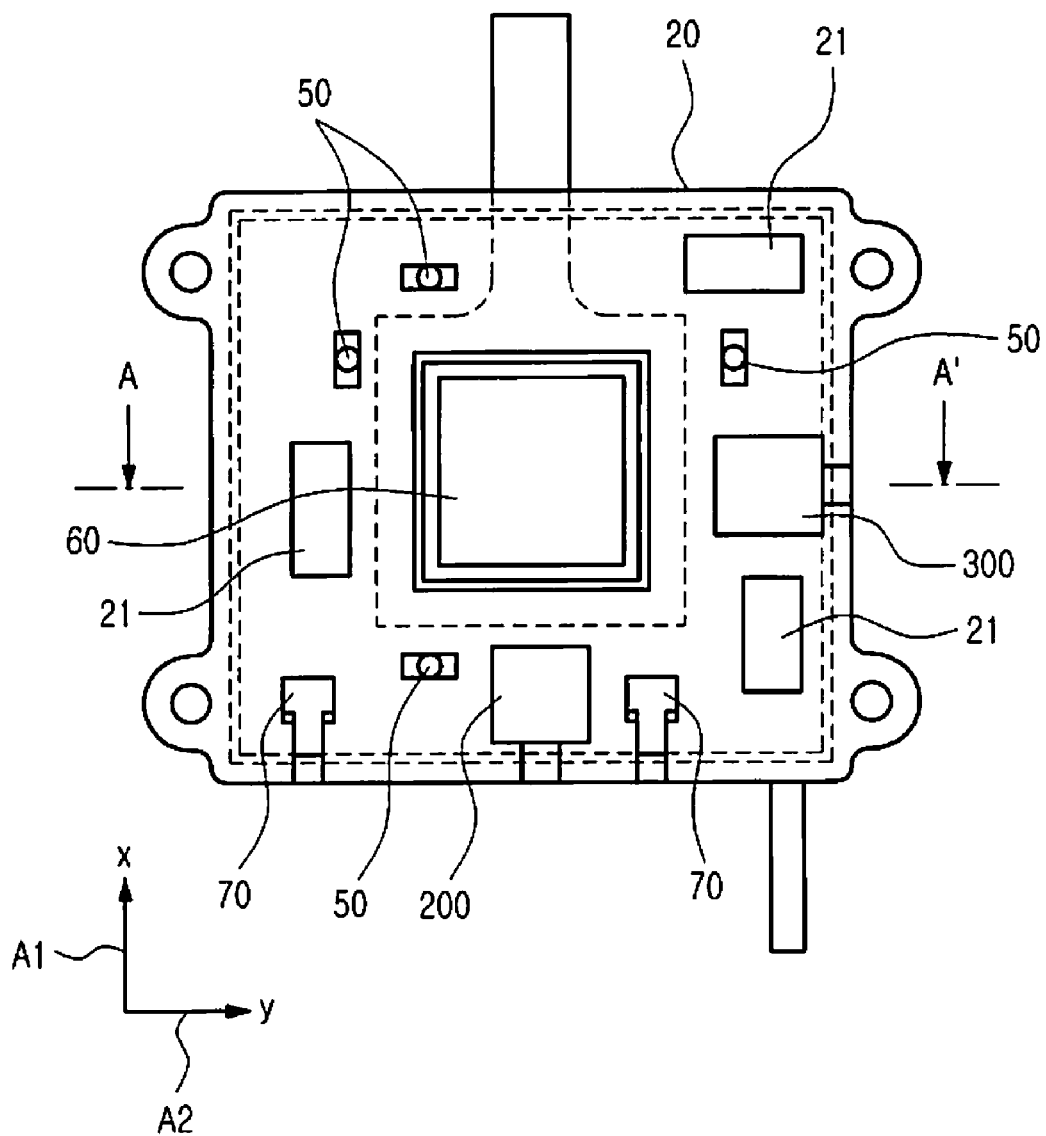
FIG. 4 illustrates an assembled state of an optical image stabilizer for a camera module assembly according to an embodiment of the present invention.

As shown in FIGS. 4 and 5, the housing 20 includes the one or more yokes 21 in positions corresponding to the one or more fixing permanent magnets 31 included in the first drive plate 30.

As shown in FIGS. 1 through 9, the one or more ball bearings 50 are provided between the housing 20 and the first drive plate 30. In this state, the second drive plate 40 is provided under the first drive plate 30 and the second drive portion 300 is provided between the first drive plate 30 and the second drive plate 40. The tip 301 formed on the second drive portion 300 and the second guide portion 500 formed in the second drive plate 40 contact each other and are coupled to each other in such a manner as to be driven in the second direction A2 (or the X-axis direction).

Figure 9:
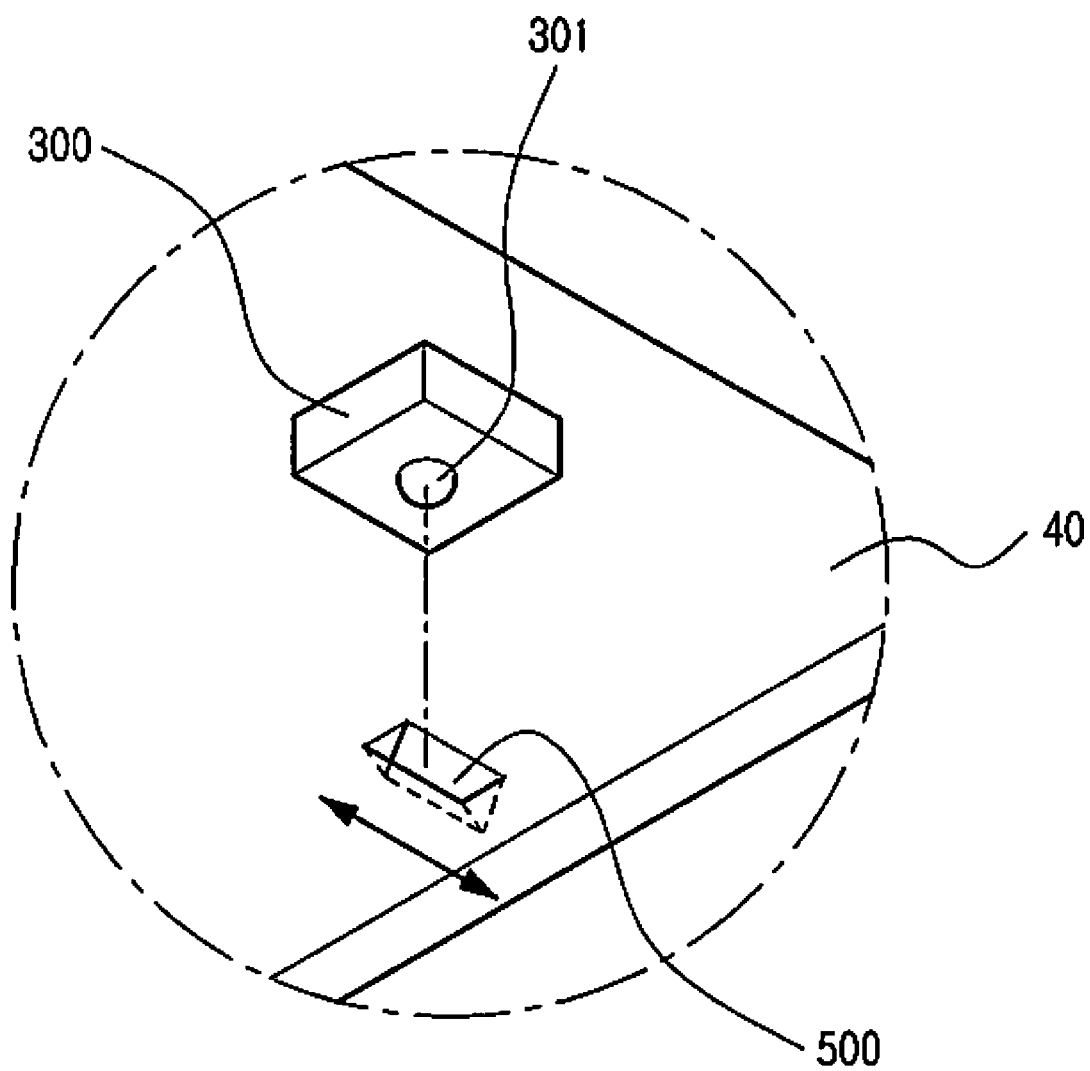
FIG. 9 is an exploded perspective view of a portion B of FIG. 8.

As shown in FIG. 9, the tip 301 is formed in a hemispheric shape and the second guide portion 500 includes a V-shaped groove.

As shown in FIGS. 1 through 9, the first and second drive plates 30 and 40 are provided in the housing 20, and the housing 20 and the first drive plate 30 attract and connect to each other by magnetic forces of the yokes 21 and the fixing permanent magnets 31. The second drive plate 40 includes magnetic objects in positions corresponding to the at least one or more fixing permanent magnets 31 included in the first drive plate 30, so as to urge the first drive plate 30 and the second drive plate 40 to attract and connect to each other by magnetic forces.

As shown in FIGS. 1 through 4, the second drive plate 40 is provided with the at least one or more sensing permanent magnets 71 and the housing 20 is provided with position detecting sensors 70 facing the sensing permanent magnets 71 to detect driving of the first and second drive plates 30 and 40 based on a change in magnetic forces generated by the sensing permanent magnets 71.

The position detecting sensors 70 include Hall sensors.

Figure 3:
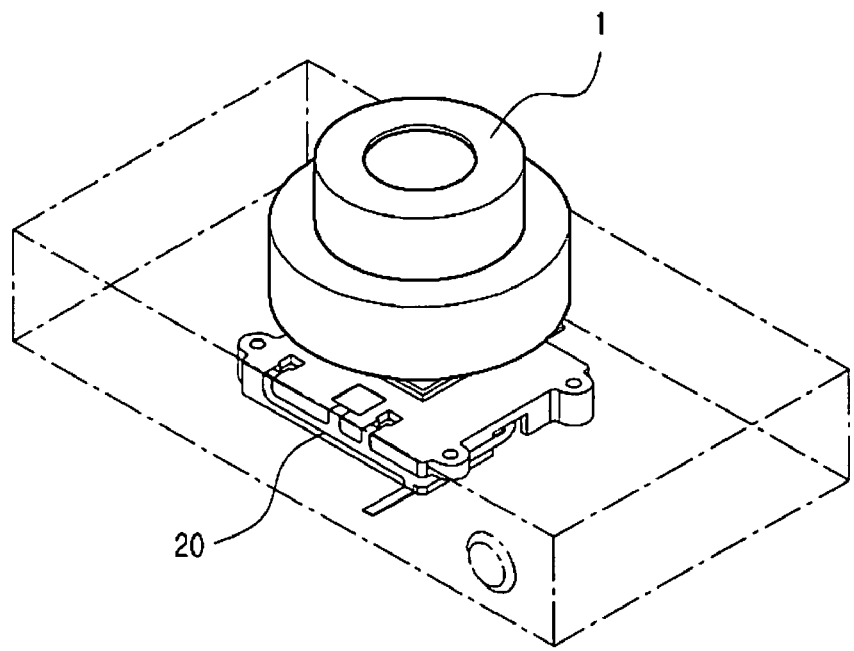
FIG. 3 illustrates a state of an optical image stabilizer mounted on a camera module assembly according to an embodiment of the present invention.

In this state, as shown in FIG. 3, the optical image stabilizer 100 is mounted on the camera module assembly 1.

The camera module assembly 1 having the optical image stabilizer 100 mounted thereon is mounted on a subminiature digital camera (not shown) or a portable terminal (not shown).

As shown in FIGS. 1 through 4, the amount of a hand-shake of a photographer is measured and signaled by a first-direction (A1 or Y-axis direction) gyro sensor (not shown) or a second direction (A2 or X-axis direction) gyro sensor (not shown) installed at one end of the subminiature digital camera or the portable terminal, and this signal is provided to an analog signal amplifier (not shown) such that a reference signal is amplified by the analog signal amplifier. Input to a microcontroller (not shown) are the amplified hand-shake amount and a position of the image sensor 60 detected by a first-direction (A1 or Y-axis direction) Hall sensor or a second-direction (A2 or X-axis direction) Hall sensor. The amount of movement which the image sensor 60 actually has to make based on the input hand-shake amount is provided as a command to a drive circuit (not shown), which drives the first and second drive portions 200 and 300 to cause displacement of the image sensor 60.

As shown in FIGS. 1 through 9, the first and second drive portions 200 and 300 drive the first and second drive plates 30 and 40 in the first direction A1 (Y-axis direction) or the second direction A2 (X-axis direction). Since the tips 201 and 301 of the first and second drive portions 200 and 300 are in contact with the first and second guide portions 400 and 500, the tips 201 and 301 linearly move by being guided by the first and second guide portions 400 and 500 upon driving of the first and second drive portions 200 and 300.

As shown in FIGS. 6 through 9, the first drive plate 30 is driven in a state where the first drive plate 30 and the housing 20 attract and connect to each other by magnetic forces of the yokes 21 and the fixing permanent magnets 31, and the second drive plate 40 is driven in a state where the second drive plate 40 and the first drive plate 30 attract and connect to each other by magnetic forces of the fixing permanent magnets 31.

The amount of displacement of the image sensor 60 leads to that of the sensing permanent magnets 71, and the amount of displacement of the sensing permanent magnets 71 causes a change in the magnetic forces of the sensing permanent magnets 71. Such a change is sensed and signaled by the Hall sensors 70, and the sensed electric signal is input to the microcontroller (not shown) to determine whether the electric signal is identical to the reference signal of the first-direction gyro sensor or the second-direction gyro sensor. If the electric signal is not identical to the reference signal, an electric signal corresponding to a difference in displacement amount between the electric signal and the reference signal is applied to the first and second drive portions 200 and 300 to adjust the amount of displacement of the image sensor 60 such that the reference signal and the electric signal can be identical to each other. In this manner, closed-loop control is performed.

As seen from the foregoing description, the first and second guide portions 400 and 500 are provided in the first and second drive plates 30 and 40 to facilitate linear movement of the first and second drive portions 200 and 300. The first and second guide portions 400 and 500 can be installed in addition to the existing ball bearings 50 supporting driving, thereby reducing the size of a product.

It will be obvious to those of ordinary skill in the art that the above-described optical image stabilizer for a camera module assembly according to the present invention is not limited to the foregoing embodiment and drawings, and various changes in form and details may be made therein without departing from the spirit and scope of the invention as defined by the appended claims.

What is claimed is:

1. An optical image stabilizer for a camera module assembly, which comprises a housing, a first drive plate for driving in a first direction, a second drive plate which includes an image sensor and is provided under the first drive plate for driving in a second direction, and one or more ball bearings provided between the housing and the first drive plate and between the first drive plate and the second drive plate, the optical image stabilizer comprising:
   a first drive portion having a tip provided between the housing and the first drive plate to drive the first drive plate in the first direction;
   a second drive portion having a tip provided between the first drive plate and the second drive plate to drive the second drive plate in the second direction; and
   first and second guide portions formed in the first and second drive plates in positions corresponding to the tips of the first and second drive portions such that the first and second guide portions guide linear movement of the tips and prevent friction when the first and second drive portions are driven in the first and second directions.

2. The optical image stabilizer of claim 1, wherein the first and second drive portions include piezo actuators, and the tips are in a hemispheric shape.

3. The optical image stabilizer of claim 1, wherein the first and second guide portions include V-shaped grooves for preventing friction.

4. The optical image stabilizer of claim 1, wherein the first direction is a Y-axis direction and the first drive portion drives the first drive plate back and forth in the Y-axis direction.

5. The optical image stabilizer of claim 1, wherein the second direction is an X-axis direction and the second drive portion drives the second drive plate back and forth in the X-axis direction.

6. The optical image stabilizer of claim 1, wherein the second drive plate is a steel plate that includes a heat sink for cooling the image sensor.

7. The optical image stabilizer of claim 1, wherein the housing comprises at least one or more yokes in positions corresponding to one or more fixing permanent magnets provided on the first drive plate to urge the housing and the first drive plate to attract and connect to each other by magnetic forces thereof, and the second drive plate comprises magnetic objects in positions corresponding to the one or more fixing permanent magnets provided on the first drive plate to urge the first drive plate and the second drive plate to attract and connect to each other by magnetic forces thereof.

8. The optical image stabilizer of claim 7, wherein the one or more yokes include steel magnetic objects.

9. An optical image stabilizer for camera module assembly, comprising:
- a housing;
- a first drive plate for driving in a first direction;
- a second drive plate which includes an image sensor and is provided under the first drive plate for driving in a second direction;
- one or more ball bearings provided between the housing and the first drive plate and between the first drive plate and the second drive plate:
- a first drive portion having a tip provided between the housing and the first drive plate to drive the first drive plate in the first direction;
- a second drive portion having a tip provided between the first drive plate and the second drive plate to drive the second drive plate in the second direction; and
- first and second guide portions formed in the first and second drive plates in positions corresponding to the tips of the first and second drive portions such that the first and second guide portions guide linear movement of the tips and prevent friction when the first and second drive portions are driven in the first and second directions.

* * * * *